United States Patent [19]
Saffari

[11] Patent Number: 4,915,719
[45] Date of Patent: Apr. 10, 1990

[54] METHOD OF PRODUCING A HERMETIC GLASS TO METAL SEAL WITHOUT METAL OXIDATION

[75] Inventor: Akbar Saffari, Freeport, Ill.

[73] Assignee: Honeywell Inc., Minneapolis, Minn.

[21] Appl. No.: 252,208

[22] Filed: Sep. 30, 1988

[51] Int. Cl.⁴ ..................... C03B 11/04; C03C 27/02
[52] U.S. Cl. ................................. 65/32.2; 65/59.23;
65/59.24; 65/59.27; 65/59.35; 174/50.63;
174/152 GM
[58] Field of Search ................... 65/32.2, 59.23, 59.24,
65/59.25, 59.27, 59.31, 59.32, 59.34, 59.35;
174/50.63, 152 GM

[56] References Cited

U.S. PATENT DOCUMENTS

| | | |
|---|---|---|
| 3,115,957 | 12/1963 | Heil . |
| 3,445,212 | 5/1969 | Bishop . |
| 3,615,325 | 10/1971 | Failling et al. ............... 65/59.34 X |
| 4,060,663 | 11/1977 | Merz et al. . |
| 4,128,697 | 12/1978 | Simpson ......................... 65/59.32 X |
| 4,148,965 | 4/1979 | Jelli . |
| 4,414,281 | 11/1983 | Hoda . |
| 4,430,376 | 2/1984 | Box ................................. 65/59.34 X |
| 4,445,920 | 5/1984 | Smith ............................... 65/32.2 X |
| 4,500,383 | 2/1985 | Kashiwagi et al. . |
| 4,678,358 | 7/1987 | Layher ........................... 65/59.31 X |
| 4,725,333 | 2/1988 | Leedecke et al. .............. 65/32.2 X |
| 4,841,101 | 6/1989 | Pollock ........................... 65/59.35 X |

FOREIGN PATENT DOCUMENTS

| | | | |
|---|---|---|---|
| 138022 | 7/1946 | Australia ............................. 65/32.2 |
| 739721 | 11/1955 | United Kingdom ................ 65/32.2 |
| 877965 | 9/1961 | United Kingdom ................ 65/32.2 |

Primary Examiner—Robert L. Lindsay
Attorney, Agent, or Firm—Charles L. Rubow

[57] ABSTRACT

A method for forming a hermetic compression glass to metal seal which leaves the metal free of oxide. A temporary assembly of a metal header having a glass bead in an aperture therethrough and an electrical feedthrough conductor passing through the glass bead is heated in a dehydrated pure hydrogen environment to above the melting temperature of the glass bead, and then cooled to solidify the bead and cause the header to contract around the bead.

16 Claims, 2 Drawing Sheets

METHOD OF PRODUCING A HERMETIC GLASS TO METAL SEAL WITHOUT METAL OXIDATION

BACKGROUND OF THE INVENTION

The invention disclosed herein relates generally to hermetic electrically insulating seals, and more specifically to a method for producing a hermetic glass to metal compression seal using a dehydrated pure hydrogen environment to avoid metal oxidation.

Hermetic seals between elements are widely required or advantageous in a variety of apparatus, particularly including electrical devices. For example, in electrical switches for use in harsh environments, the switching elements are located in a sealed chamber and hermetic seals are required where feedthrough conductors or terminals pass through the chamber wall. Hermetically sealed switches are frequently provided with metal cases from which the feedthrough conductors must be electrically insulated. It is known to fabricate such switches by utilizing a metal header having apertures therethrough for accommodating the feedthrough conductors and forming the seals around the feedthrough conductors from glass.

A variety of factors must be considered in forming a glass to metal seal for an electrical feedthrough conductor. These include the electrical properties of the material from which the conductor is formed, the thermal coefficients of expansion of the glass and metal parts, the melting or softening temperatures of the glass and metal materials, the suitability of the metals from which the feedthrough conductors and other metal parts are made for subsequent processing steps, such as soldering, brazing, welding, crimping, etc., and the number and complexity of preparatory processes required to permit subsequent fabrication and utilization.

Two general types of hermetic glass to metal seals are known. These are bonded seals in which the molten glass wets and adheres to the metal surface as the glass solidifies, and compression seals in which sealing is accomplished by large compression forces on an inner member, such as a glass bead, by an outer member. Hermetic seals may also employ a combination of these characteristics.

One of the problems encountered with bonded seals where the glass and metal have different thermal coefficients of expansion, as is true for most types of glass and metal, arises from stress concentrations set up in the glass. Since, in a bonded seal, the molten glass wets the surfaces of the contiguous metal parts, the glass forms a concave meniscus leaving a thin glass edge. As the assembly cools and the glass solidifies, stresses are created in the glass due to the different thermal coefficients of expansion. The thin glass edges may not be able to withstand these stresses. The result may be cracks which propagate through the glass elements and jeopardize the hermetic seal.

A concurrent manufacturing disadvantage may accompany the use of bonded hermetic glass to metal seal assemblies in that wetting of the metal surfaces by the molten glass occurs only if the metal surfaces have an oxide formed thereon which occurs normally when the metals from which the metal parts are commonly made are subjected to the melting temperature of the glass in anything but a highly reducing environment. This oxide must be removed for subsequent manufacturing steps, such as brazing or welding housing parts together, making either internal or external soldered, brazed or welded connections to the feedthrough conductors, etc. Removal of the oxidation requires disadvantageous cleaning steps in the manufacturing process.

The applicant has discovered that a satisfactory hermetic glass to metal seal can be achieved by selecting glass and metal materials to result in a compression seal, and conducting the processes to form the seal in a highly reducing environment which avoids the formation of thin glass sections subject to stress cracking and the formation of oxide whose removal requires disadvantageous manufacturing steps.

SUMMARY OF THE INVENTION

The present invention is a method for producing an article having an electrical feedthrough conductor extending through a metal header and electrically insulated therefrom by a glass hermetic seal, the method leaving the feedthrough conductor and header substantially free of oxide. The method comprises providing a metal header having an aperture therethrough through which a feedthrough conductor extends and a glass bead positioned in the aperture surrounding the conductor, the material of the glass bead having a lower coefficient of thermal expansion than the material of the metal header. The header, glass bead and feedthrough conductor are heated in a dehydrated pure hydrogen environment to a temperature above the melting temperature of the glass bead. The header, glass bead and feedthrough conductor are then cooled in the dehydrated pure hydrogen environment to solidify the glass bead and contract the header around the solidified bead to form a hermetic compression seal. The glass bead is preferably formed of a lead free glass and the metal header may be formed of stainless steel. The header, glass bead and feed-through conductor may be heated at a rate of approximately 15° C. per second, soaked at a temperature of approximately 1900° F. for a period of approximately 7.5 minutes and then cooled at a rate of approximately 25° C. per second.

DESCRIPTION OF THE PREFERRED EMBODIMENT

Figure 1:
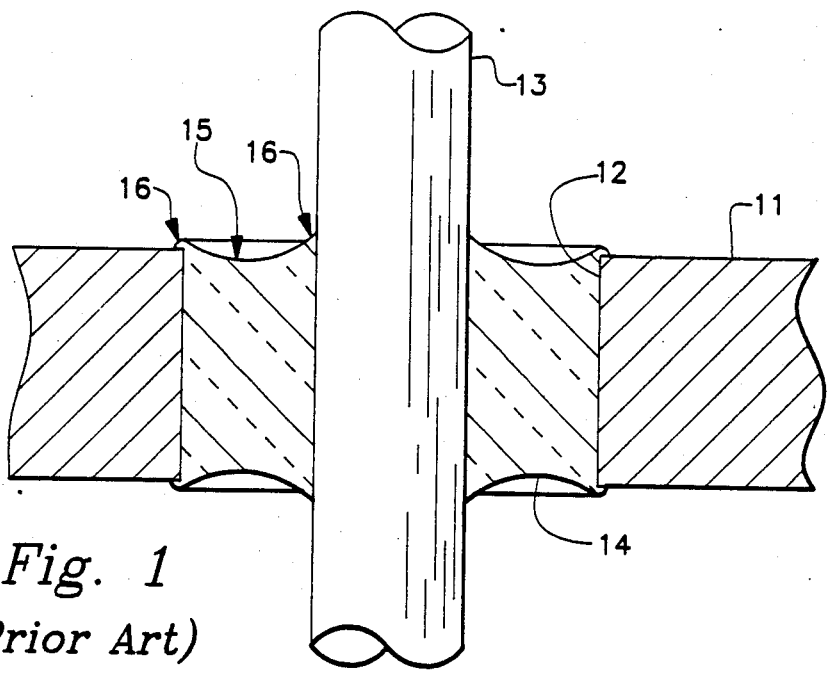
FIG. 1 is an enlarged partial cross sectional view of a header hermetically sealed to a feedthrough conductor by a conventional glass to metal sealing process.

In the conventional glass to metal electrical feedthrough seal illustrated in FIG. 1, reference numeral 11 identifies a metal header, which may be part of an electrical switch. Header 11 is formed with an aperture 12 therethrough for accommodating an electrical feedthrough conductor 13 which extends through aperture 12. Reference numeral 14 identifies a glass seal 14 surrounding conductor 13 in aperture 12.

Glass seal 14 is initially in the form of a bead loosely surrounding conductor 13 and loosely fitting into aperture 12. Using conventional processing techniques, this temporary assembly of parts is heated to above the melting temperature of the glass bead, and then cooled to solidify the glass in the form of a seal. The glass material of seal 14 is selected to have substantially no lead content to minimize out gassing. This glass material has a relatively high softening temperature and a relatively low thermal coefficient of expansion.

Header 11 is typically formed of cold rolled steel or stainless steel, both of which have a significantly higher thermal coefficient of thermal expansion than glass seal 14. Conductor 13 is formed of a chromium-nickel-iron composition which has a coefficient of thermal expansion which is relatively low, but higher than the coefficient of thermal expansion of seal 14.

As the assembly is heated, header 11 expands along with aperture 12 therethrough. The glass bead melts, and fills the additional volume of the aperture. As the assembly is cooled, header 11 and aperture 12 contract at a faster rate than seal 14 and subject seal 14 to heavy compression forces which, because of the elasticity of seal 14, are partially transmitted to conductor 13, thus forming a compression hermetic seal.

Heating of the parts has typically been performed in a neutral to slightly reducing environment. In such an environment, the metal compositions of which header 11 and conductor 13 are formed oxidize readily. This surface oxide causes the molten glass to wet the surfaces of the metal parts, thus resulting in bonding of the glass to the metal surfaces to form a bonded hermetic seal.

Because the molten glass wets the surfaces of the metal parts, its surface tension causes a concave meniscus as shown at 15 and thin glass sections where the glass surface meets the metal surfaces as shown at 16. Particularly as header 11 and conductor 13 are subjected to soldering, brazing or welding operations, the thin glass sections may become stressed to the extent that cracks are formed which may propagate through the remainder of the glass body and jeopardize the hermetic seal.

The surfaces of header 11 and conductor 13 must have the oxide removed therefrom in order to permit subsequent soldering, brazing and/or welding operations. Removal of the oxide entails additional steps whose avoidance would be advantageous in a manufacturing process.

Figure 2:
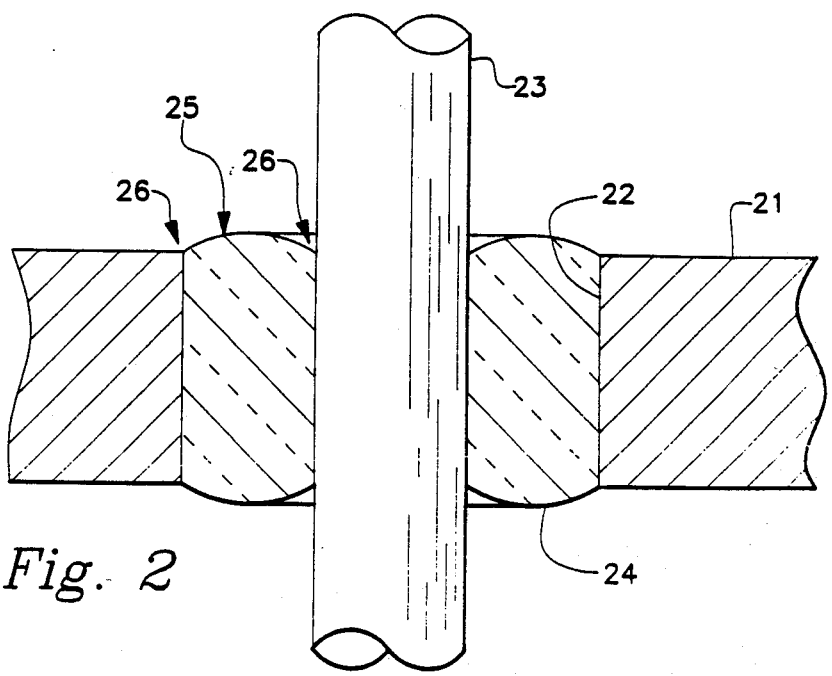
FIG. 2 is an enlarged partial cross sectional view of a header hermetically sealed to a feedthrough conductor by the applicant's method of forming a glass to metal seal.

FIG. 2 illustrates a header and electrical feedthrough assembly similar to that of FIG. 1, but formed using the applicant's method. The header, aperture therethrough, electrical feedthrough conductor and glass seal are identified by reference numerals 21, 22, 23 and 24 respectively. However, the process of heating the header, glass bead and conductor is done in a highly reducing dehydrated pure hydrogen environment which does not result in oxidation of the surfaces of header 21 or conductor 23. Satisfactory melting of the glass material requires that the temperature of the parts be raised to between 1700° F. and 2100° F., and preferably 1900° F.∓50° F., for a period of from 5 to 10 minutes. In order to avoid oxidation of the surfaces of the metal parts, the hydrogen must be kept at a dew point of at least −50° F., and preferably as low as −70° F. This has been found to necessitate a hydrogen flow rate of approximately 15 cubic feet per hour.

The lack of metal oxide prevents the molten glass from wetting the metal surfaces. The surface tension of the molten glass thus causes a convex meniscus as shown at 25. Also, thin glass sections where the glass meets the metal, as at reference numeral 26, are avoided. As the assembly is cooled, seal 24 solidifies and header 21 exerts heavy compression forces thereon which are partially transmitted to conductor 23. The compression seal thus formed has been found to provide satisfactory hermetic sealing. In addition, glass seal 24 is not subject to stress fracturing upon subsequent soldering, brazing and/or welding operations, and oxide removal steps prior to such soldering, brazing or welding operations are reduced or eliminated.

Figure 3:
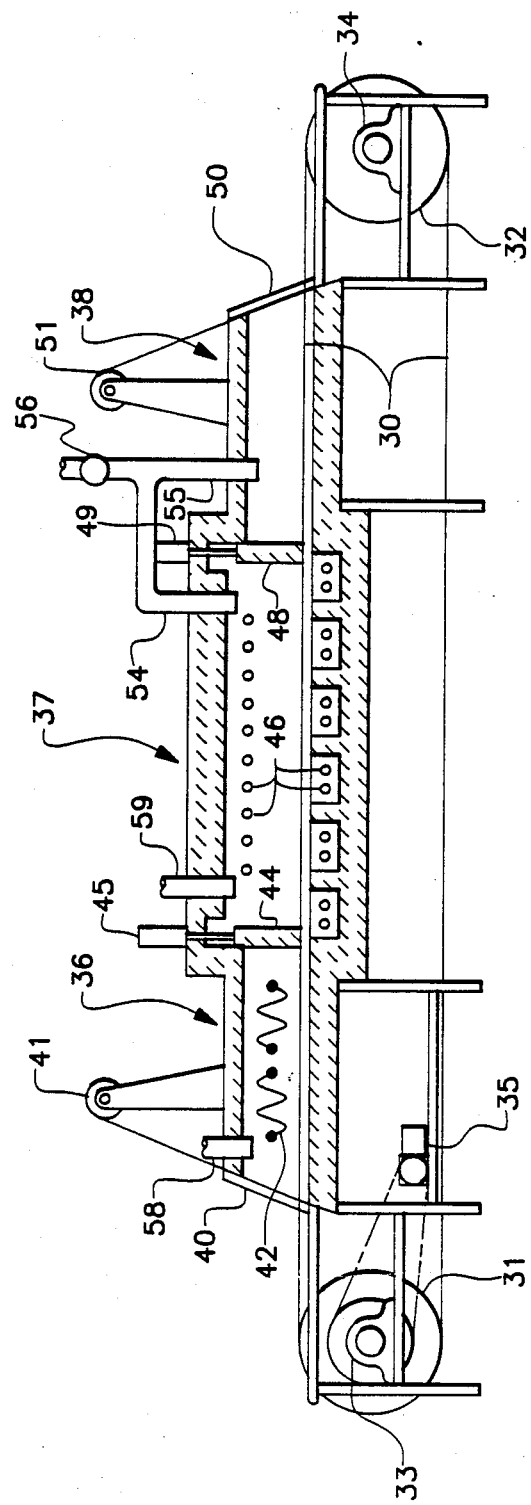
FIG. 3 is a cross sectional schematic representation of a furnace for producing the glass to metal seal of FIG. 2.

The applicant's process may be carried out in a sintering oven as shown in FIG. 3 in which reference numeral 30 identifies a mesh belt which passes around drums 31 and 32 journalled in bearings 33 and 34 respectively, and of which drum 31 is driven by a motor and speed regulator 35.

The furnace includes a preheat chamber, a high heat chamber and a cooling chamber generally identified by reference numerals 36, 37 and 38 respectively through which belt 30 passes in sequence. Reference numeral 40 identifies an entrance door to preheat chamber 36 which may be lifted by an operator 41. Preheat chamber 36 contains preheat elements 42 which, according to the applicant's process, are capable of raising the temperature of the parts in the preheat chamber at a rate of 25° C. per second.

Parts on conveyor 30 pass from preheat chamber 36 through an intermediate door 44 controlled by an operator 45 into high heat chamber 37. Reference numeral 46 identifies heating elements in chamber 37 which are capable of maintaining the temperature of parts in the chamber at 2100° F. According to the applicant's process, the parts remain in chamber 37 at from 1700° F. to 2100° F. for a period of from 5 to 10 minutes.

Parts in chamber 37 then pass through an intermediate door 48 controlled by an operator 49 into cooling chamber 38. Cooling chamber 38 includes means (not shown) capable of cooling the parts therein at a rate of 15° C. per second. The parts then pass from cooling chamber 38 through an exit door 50 controlled by an operator 51.

During the preheating, heat soaking and cooling operations, a dehydrated pure hydrogen environment is maintained within the furnace. This is accomplished by introducing hydrogen having a dew point at least as low as −50° F., and preferably 70° F., into high heat and cooling chambers 37 and 38 through inlet tubes 54 and 55 under the control of metering device 56. Hydrogen is removed from preheat and high heat chambers 36 and 37 through exhaust tubes 58 and 59. This arrangement is designed to provide a flow of dehydrated hydrogen of approximately 15 cubic feet per hour through the furnace in a direction opposite to the direction of travel of parts through the furnace. The heating and cooling rates, as well as the travel speed are maintained such that the parts are subjected to glass to metal sealing and brazing temperatures for a minimum of 5 minutes.

In accordance with the foregoing description, the applicant has provided a unique method for producing glass to metal seals which reduces or eliminates stress fractures in the glass which may otherwise occur as a result of subsequent soldering, brazing or welding operations, and which also reduces or eliminates the necessity for oxide removal and other cleaning operations of the metal parts prior to such soldering, brazing or welding operations. Although the applicant's method has been shown and described with particularlity, variations of the method which do not depart from the applicant's contemplation and teaching will be apparent to those of ordinary skill in the art. It is not intended that coverage be limited to the disclosed embodiment, but only by the terms of the following claims.

I claim:

1. A method for producing an article having an electrically insulating hermetic seal surrounding an electrical feedthrough conductor extending through a metal header, the method leaving the feedthrough conductor and header substantially free of oxide, comprising the steps of:

providing a metal header having an aperture therethrough for accommodating an electrical feedthrough conductor;

providing an electrical feedthrough conductor which extends through the aperture in the metal header;

providing a glass bead of a material selected to have a lower coefficient of thermal expansion than the material of the metal header in the aperture in the metal header surrounding the feedthrough conductor;

heading the header, glass bead and feedthrough conductor to above the melting temperature of the glass bead in a dehydrated pure hydrogen environment which is sufficiently dry to substantially preclude oxidation of the surfaces of the metal header and feedthrough conductor; and cooling the assembled header, glass bead and feedthrough conductor in the dehydrated pure hydrogen environment which is sufficiently dry to substantially preclude oxidation of the surfaces of the metal header and feedthrough conductor to solidify the glass head, whereby the header contracts around the solidified glass bead to form a hermetic compression seal.

2. The method of claim 1 wherein the glass bead is formed of lead free glass.

3. The method of claim 2 wherein the metal header is formed of stainless steel.

4. The method of claim 3 wherein the assembled header, glass bead and feedthrough conductor are maintained at a temperature of from 1700° F. to 2100° F. for a period of from 5 minutes to 10 minutes.

5. The method of claim 4 wherein the dew point of the dehydrated hydrogen environment is at least as low as −50° F.

6. The method of claim 5 wherein the assembled header, glass bead and feedthrough conductor are preheated at a rate of substantially 25° C. per second.

7. The method of claim 6 wherein the assembled header, glass bead and feedthrough conductor, after having been heated, are cooled at a cooling rate of substantially 15° C. per second.

8. The method of claim 7 wherein the assembled header, glass bead and feedthrough conductor are surrounded by a flowing dehydrated pure hydrogen environment.

9. A method for producing an article having an electrical feedthrough conductor extending through a metal header and electrically insulated therefrom by a hermetic seal, the method leaving the feedthrough conductor and header substantially free of oxide, comprising the steps of:

providing a metal header having an aperture therethrough with a glass bead in the aperture and an electrical feedthrough conductor extending through a hole in the glass bead, the material of the glass bead having a lower coefficient of thermal expansion than the material of the metal header;

heating the header, glass bead and feedthrough conductor in a dehydrated pure hydrogen environment to a temperature above the melting temperature of the glass bead, the hydrogen environment being sufficiently dry to substantially preclude oxidation of the surfaces of the metal header and feedthrough conductor; and cooling the header, glass bead and feedthrough conductor in the dehydrated pure hydrogen environment to solidify the glass bead and contract the header around the solidified glass bead to form a hermetic compression seal, the hydrogen environment being sufficiently dry to substantially preclude oxidation of the surfaces of the metal header and feedthrough conductor.

10. The method of claim 9 wherein the header, glass bead and feedthrough conductor are sequentially preheated, allowed to soak at a predetermined temperature and cooled in a chamber having dehydrated substantially pure hydrogen flowing therethrough.

11. The method of claim 10 wherein the dehydrated pure hydrogen has a dew point at least as low as −50° F.

12. The method of claim 11 wherein the glass bead is formed of lead free glass.

13. The method of claim 12 wherein the metal header is formed of stainless steel.

14. The method of claim 13 wherein the header, glass bead and feedthrough conductor are heated at a rate of substantially 25° C. per second.

15. The method of claim 14 wherein the header, glass bead and feedthrough conductor are soaked at a temperature of from 1700° F. to 2100° F. for a period of from 5 minutes to 10 minutes.

16. The method of claim 15 wherein the header, glass bead and feedthrough conductor are cooled at a rate of substantially 15° C. per second.

* * * * *

UNITED STATES PATENT AND TRADEMARK OFFICE
CERTIFICATE OF CORRECTION

PATENT NO. : 4,915,719

DATED : APRIL 10, 1990

INVENTOR(S) : AKBAR SAFFARI

It is certified that error appears in the above-identified patent and that said Letters Patent is hereby corrected as shown below:

Claim 1, column 1, line 20, delete "heading", insert --heating--.

Signed and Sealed this

Thirteenth Day of August, 1991

*Attest:*

HARRY F. MANBECK, JR.

*Attesting Officer*     *Commissioner of Patents and Trademarks*